United States Patent [19]

Meguerian et al.

[11] 4,006,103
[45] Feb. 1, 1977

[54] CATALYST FOR TREATING EXHAUST GAS FROM INTERNAL COMBUSTION ENGINE

[75] Inventors: Garbis H. Meguerian, Olympia Fields; Eugene H. Hirschberg, Park Forest; Frederick W. Rakowsky, Naperville, all of Ill.

[73] Assignee: Standard Oil Company (Indiana), Chicago, Ill.

[22] Filed: Nov. 3, 1975

[21] Appl. No.: 628,352

Related U.S. Application Data

[63] Continuation-in-part of Ser. No. 336,256, Feb. 27, 1973, abandoned.

[52] U.S. Cl. .......................... 252/438; 252/455 R; 252/466 B; 252/472; 423/213.5
[51] Int. Cl.² .................... B01J 21/04; B01J 23/40; B01J 23/74; B01J 27/24
[58] Field of Search .............. 252/466 B, 472, 438, 252/455 R; 423/213.5, 213.7

[56] References Cited

UNITED STATES PATENTS 3,886,260   5/1975   Unland .......................... 423/213.5

*Primary Examiner*—W. J. Shine
*Attorney, Agent, or Firm*—James L. Wilson; Arthur G. Gilkes; William T. McClain

[57] ABSTRACT

The catalyst comprises a nickel component, a rhodium component, and a monolithic ceramic support. It may also contain a platinum component and/or a palladium component and the monolithic ceramic support may be coated with a wash coat of a ceramic material having a relatively high surface area. The nickel component and the rhodium component are deposited upon the monolithic ceramic support sequentially and in that order.

The method of catalyst preparation and a process using such catalyst are also disclosed.

17 Claims, 6 Drawing Figures

EXHAUST GAS FLOW

EXHAUST GAS FLOW

EFFECT OF RHODIUM CONCENTRATION ON FRESH AND AGED
ACTIVITIES OF NICKEL-RHODIUM $NO_x$ CATALYST

CATALYST FOR TREATING EXHAUST GAS FROM INTERNAL COMBUSTION ENGINE

CROSS-REFERENCE TO RELATED APPLICATION

This is a continuation-in-part application of co-pending application Ser. No. 336,256, filed on Feb. 27, 1973, and now abandoned.

BACKGROUND of the INVENTION

In the future, the amount of nitrogen oxide gases emitted from an automobile will have to be reduced to levels of about 100 p.p.m. Also, most carbon monoxide and hydrocarbons present in the exhaust gas will have to be eliminated. The contemplated system for treating these exhaust contaminants includes a multiple-stage catalytic converter, e.g., a two-stage catalytic converter. The first stage or reactor treats, under reducing conditions, exhaust gases directly coming from the exhaust system. In this first reactor, the nitrogen oxide ($NO_x$) gases in the exhaust gas react with hydrocarbons and carbon monoxide in the exhaust gas. Just prior to, or in the second stage or reactor, oxygen is injected into the exhaust stream. Oxidation occurs in this second stage where the hydrocarbons and carbon monoxide react with the oxygen. External oxygen may also be injected into the first stage at engine start up in order to meet federal emission standards for carbon monoxide and hydrocarbons. When the engine is warmed up, oxygen injection into the first stage is terminated. Each stage of the two-stage converter contains different types of catalyst. This type of converter requires that the internal combustion engine must be operated at fuel-rich conditions, insuring the presence of sufficient carbon monoxide and hydrogen to react with the nitrogen oxide gases.

The catalyst in the first stage is called the $NO_x$ catalyst, and it promotes the reduction of nitrogen oxides. Several different and sometimes competing reactions can and do occur as the exhaust gas flows over the $NO_x$ catalyst. The most important reactions are:

$$NO_x + CO \rightarrow N_2 + CO_2 \quad (1)$$

$$NO_x + H_2 \rightarrow NH_3 + N_2 + H_2O \quad (2)$$

$$2CO + O_2 \rightarrow 2CO_2 \quad (3)$$

$$2H_2 + O_2 \rightarrow 2H_2O \quad (4)$$

Reaction No. 1 is the reaction responsible for eliminating $NO_x$ as an exhaust pollutant. Advantageously, the $NO_x$ catalyst favors this reaction rather than Reactions Nos. 3 and 4, and preferably, over a wide range of temperatures for example, from 700° in 1,700° F. Reaction No. 2 is undesirable because ammonia formed in the first stage of the converter will be converted to nitrogen oxide in the second stage, defeating at least in part the purpose of the converter. Consequently, a desirable $NO_x$ catalyst will not promote Reaction No. 2 or will minimize formation of $NH_3$ in favor of $N_2$. (Reduction to $NH_3$ occurs most frequently at low temperatures.) Reactions Nos. 3 and 4 are undesirable in the first stage because carbon monoxide and hydrogen are oxidized. The $NO_x$ catalyst requires that some carbon monoxide be present in the exhaust gas. However, there is also some oxygen present in the exhaust gas, which oxygen reacts with carbon monoxide using, in the first stage, the carbon monoxide least advantageously. The preferred $NO_x$ catalyst will selectively promote the reaction of carbon monoxide with $NO_x$ in the presence of small amounts of oxygen (up to about 1%).

It is believed that an effective $NO_x$ catalyst should have the following characteristics:

1. It must be effective at temperatures ranging from 700° to 1,700° F. At the low end of this temperature range, it must remove or reduce at least 50% of the $NO_x$ in the exhaust gas. At the high end of this range, it must remove or reduce about 90% of the $NO_x$ in the exhaust gas.
2. It must be stable at the higher temperatures under alternating oxidizing and reducing conditions, that is, the catalyst must retain a high activity.
3. It must be effective at fuel-air ratios close to stoichiometric [carbon-monoxide-to-oxygen ($CO/O_2$) ratios near 2 and CO concentrations about 1%]. This conserves on fuel.
4. It must resist sulfur poisoning, since sulfur, at least in small amounts, is present in most grades of gasoline.
5. It must minimize ammonia formation at low operating temperatures.
6. Preferably, it should be capable of promoting at low temperatures (700° F. and lower) the oxidation of carbon monoxide. This is desirable in order to pass the federal cold start test procedure.

There have now been found an improved $NO_x$ catalyst and a process for treating exhaust gases, which process employs that catalyst.

SUMMARY OF THE INVENTION

In accordance with the invention, there is provided a catalyst for the reduction of nitrogen oxides in the exhaust gas from an internal combustion engine, a method for preparing such a catalyst, and a process for treating such an exhaust gas.

Broadly, the catalyst comprises a nickel component, a rhodium component, and a monolithic ceramic support for said nickel component and said rhodium component, said nickel component being present in an amount ranging from 2.5 to 12 wt.%, expressed as the metal and based on total catalyst weight, and comprising at least 75 weight percent of the total active metals present, and said rhodium component being present in an amount ranging from 0.01 to 0.08 wt.%, expressed as the metal and based on total catalyst weight. The catalyst is prepared by sequentially applying in the order specified hereinbelow to said monolithic ceramic support first a solution containing a dissolved salt of nickel and second a solution containing a dissolved salt of rhodium, the application of each solution being followed by the removal of the diluent of that solution to deposit on the support the salt of that solution and the calcination of the support with the salt of that solution thereon, said calcination being conducted in air at a temperature of about 1,000° to 1,500° F.

The monolithic ceramic support may be coated with a wash coat of a ceramic material having a relatively high surface area, said wash coat having a surface area that will provide the coated ceramic support with a surface area that is at least 10 square meters per gram.

The catalyst may also comprise a platinum component, or a palladium component, or a mixture thereof. Such platinum component and/or palladium component will be present in an amount of 0.02 to 0.15 wt.%, expressed as the metal and based on total catalyst weight. The deposition of the platinum component and/or the palladium component is performed subsequent to that of the nickel component and prior to that of the rhodium component and comprises applying to said monolithic ceramic support a solution containing a dissolved salt of platinum and/or applying a solution containing a dissolved salt of palladium, the application of each solution being followed by the removal of the diluent of that solution to deposit on the support the salt of that solution and the calcination of the support with the salt of that solution thereon, said calcination being conducted in air at a temperature of about 1,000° to 1,500° F.

The method for preparing the catalyst comprises the following steps in the specified sequence: (1) applying to said support a first solution, said first solution containing a dissolved salt of nickel; (2) removing the diluent of said first solution from said support to deposit on said support the salt of said first solution; (3) calcining said support with the salt of said first solution thereon in air at a temperature of about 1,000° to 1,500° F; (4) applying to said support a second solution, said second solution containing a dissolved salt of rhodium; (5) removing the diluent of said second solution from said support to deposit on said support the salt of said second solution; and (6) calcining said support with the salt of said second solution thereon in air at a temperature of about 1,000° to 1,500° F.

The process comprises operating the internal combustion engine under fuel-rich conditions so that the exhaust gas from the engine includes at least 0.8 vol.% carbon monoxide and the ratio of carbon monoxide to oxygen ($CO/O_2$) in the exhaust gas exceeds about 1; and passing the exhaust gas through a reduction zone maintained at a temperature of about 700° to about 1,800° F. so that nitrogen oxide gases in the exhaust gas react with the carbon monoxide and other reducing agents in the exhaust gas, said zone including a catalyst comprising a nickel component, a rhodium component, and a monolithic ceramic support for said nickel component and said rhodium component, said catalyst being the catalyst defined hereinabove. In this process, the catalyst may be activated by subjecting it to reducing conditions at temperatures in excess of 1,000° F. for a duration which substantially increases the activity of the catalyst.

BRIEF DESCRIPTION OF THE DRAWINGS

This application is accompanied by six figures.

DESCRIPTION AND PREFERRED EMBODIMENT

Figure 1:
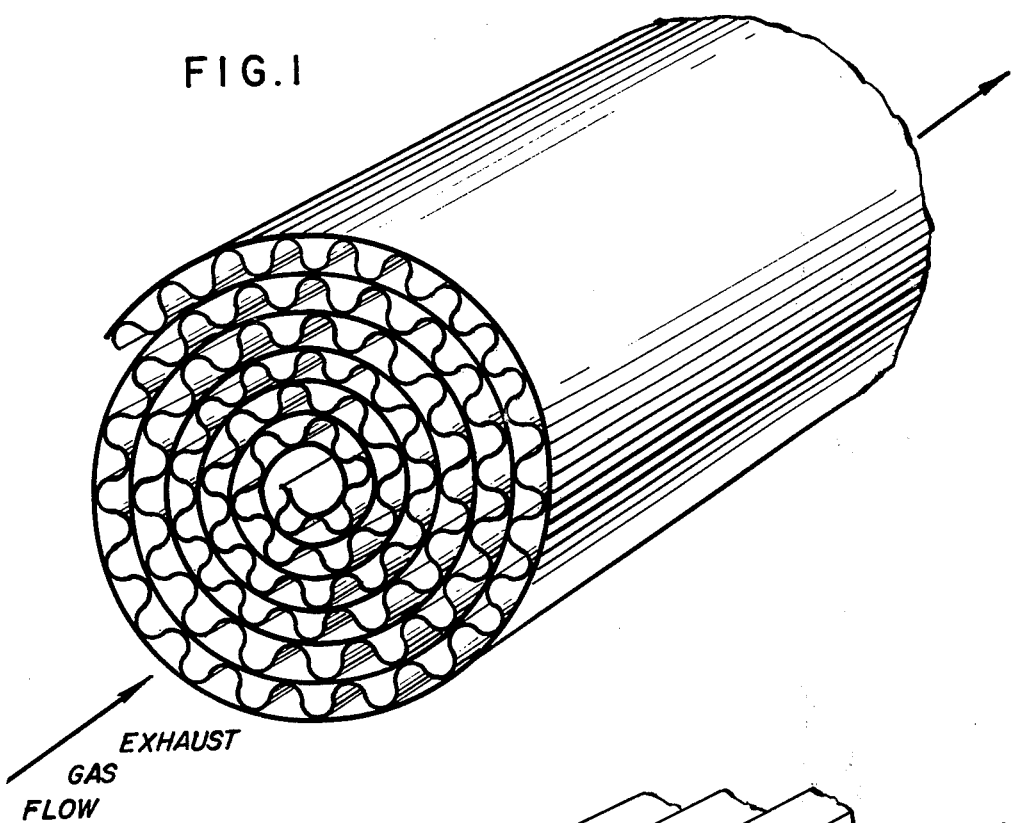
FIG. 1 is a perspective view schematically showing one type of monolithic ceramic support used in accordance with this invention.

In accordance with the present invention, there is provided a catalyst for the reduction of nitrogen oxides in the exhaust gas from an internal combustion engine. There are also provided a method for preparing such a catalyst and a process for the treatment of an exhaust gas from an internal combustion engine, which process employs such catalyst.

The catalyst comprises a nickel component, a rhodium component, amnd a monolithic ceramic support for said nickel component and said rhodium component, said nickel component being present in an amount ranging from 2.5 to 12 wt. %, expressed as the metal and based on total catalyst weight, and comprising at least 75 wt.% of the total active metals present, and said rhodium component being present in an amount ranging from 0.01 to 0.08 wt.%, expressed as the metal and based on total catalyst weight, said catalyst being prepared by sequentially applying in the order specified hereinbelow to said monolithic ceramic support first a solution containing a dissolved salt of nickel and second a solution containing a dissolved salt of rhodium, the application of each solution being followed by the removal of the diluent of that solution to deposit on the support the salt of that solution and the calcination of the support with the salt of that solution thereon, said calcination being conducted in air at a temperature of about 1,000° to 1,500° F.

The process comprises operating the internal combustion engine under fuel-rich conditions so that the exhaust gas from the engine includes at least 0.8 vol.% carbon monoxide and the ratio of carbon monoxide to oxygen in the exhaust gas exceeds about 1; and passing the exhaust gas through a reduction zone maintained at a temperature of about 700° to about 1,800° F. so that nitrogen oxide gases in the exhaust gas react with the carbon monoxide and other reducing agents in the exhaust gas, said zone including a catalyst comprising a nickel component, a rhodium component, and a monolithic ceramic support for said nickel component and said rhodium component, said nickel component being present in an amount ranging from 2.5 to 12 wt.%, expressed as the metal and based on total catalyst weight, and comprising at least 75 wt.% of the total active metals present, and said rhodium component being present in an amount ranging from 0.01 to 0.08 wt.%, expressed as the metal and based on total catalyst weight, said catalyst being prepared by sequentially applying in the order specified hereinbelow to said monolithic ceramic support first a solution containing a dissolved salt of nickel and second a solution containing a dissolved salt of rhodium, the application of each solution being followed by the removal of the diluent of that solution to deposit on the support the salt of that solution and the calcination of the support with the salt of that solution thereon, said calcination being conducted in air at a temperature of about 1,000° to 1,500° F.

After extensive research, it has been concluded that a monolithic ceramic support must be used rather than pelleted type supports. The pellets are slow to heat up and, after being exposed at high temperatures to cyclic oxidation and reduction conditions, they lose their strength, crumble and break apart. The ceramic monolithic supports, in contrast, heat up quickly, are tough, strong and durable, being able to withstand the severe conditions in the emissions converter. To have good activity, it appears that the surface area of the monolithic support must be a minimum of 10 square meters per gram. The monolithic support may be prepared to have such a surface area or, if its surface area is less than 10 square meters per gram, it may be wash coated with a ceramic having a relatively high surface area. The wash coat may be the same ceramic material as or a different ceramic material than the monolithic member, although it will ordinarily have a surface area of 20 to 30 square meters per gram of combined support and wash coat after being applied to the monolithic support. About 3 to 15 wt.%, based on total catalyst weight, of the high surface area ceramic is used. This higher surface area ceramic material may be a suspension of solids in water, and it has been found that alumina suspensions made with Dispal (Continental Oil Co.) and GB-200 (Rhodia, Inc.) are most suitable. Manufacturers of suitable monolithic supports are American Lava Corporation, Corning Glass Works, E. I. DuPont Company, and Ford Motor Company.

Figure 2:
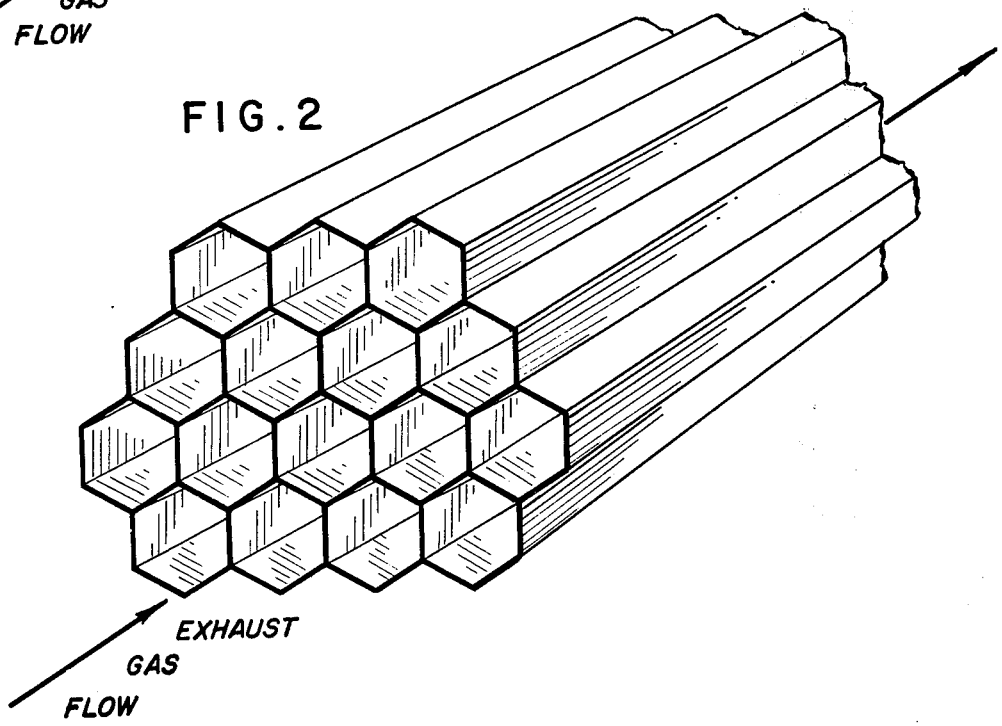
FIG. 2 is a perspective view schematically showing an alternate type of monolithic ceramic support used in accordance with this invention.

Suitable monolithic supports are illustrated in FIGS. 1 and 2. In FIG. 1, the support is made by a laid up process. In FIG. 2 the support is made by an extrusion method. The ceramic material used to make the monolithic member may be, for example, alpha-alumina, aluminum silicate (mullite), lithium aluminum silicate (beta-spodumene), silicon nitride, or magnesium aluminum silicate (cordierite).

As illustrated in FIGS. 1 and 2, the exhaust gas flows longitudinally through the channels in the monolithic support. The path of flow is not particularly important so long as there is adequate time for the gases to contact the surface of the support. This support should be able to withstand the high temperatures of the exhaust gases; therefore, it has a melting point greater than about 2,200° F. As used in most conventional-size automobiles, the support will weigh approximately 1 to 3 pounds and occupy from about 50 to 150 cubic inches.

The catalyst comprises active ingredients, as well as the monolithic ceramic support. The catalyst comprises nickel as an active ingredient, with a small amount of rhodium as a promoter. Nickel, although a very desirable ingredient because it suppresses the formation of ammonia, is active as $NO_x$ catalyst only at temperatures above 1,200° to 1,300° F. Rhodium in only small amounts promotes strongly the activity of nickel. The combination of nickel-rhodium, thus, produces a $NO_x$ catalyst that is very active at temperatures as low as 700° F., minimizes ammonia formation, and unexpectedly shows unusual resistance to poisoning by sulfur. It is critical to the present invention that the rhodium be present in an amount less than 0.1 percent, based on the total catalyst weight. Rhodium is a precious metal in short supply and it is not feasible to use rhodium in catalysts for treating automobile exhaust if the amount of rhodium required exceeds 0.1 percent. It has been found that when only a small amount of rhodium is used, for example, from 0.005 to 0.08 wt.% rhodium, advantageously, from 0.01 to 0.08 wt.%, and preferably, from 0.01 to 0.06 wt.%, it enhances the activity of the nickel, making the catalyst effective as a nitrogen oxide reducing catalyst at temperatures as low as 700° F.

The catalyst of the present invention may also contain platinum and/or palladium. It has been found that the platinum palladium serves to impart a dual function to the catalyst. Specifically, this catalyst can be used to promote the oxidation of carbon monoxide to carbon dioxide at low temperature (700° F. and lower). In the first stage of the converter, it is sometimes desirable to have the $NO_x$ catalyst promote both oxidation and reduction. It is especially useful to have this property in order to meet the cold start federal test specifications for carbon monoxide and hydrocarbons. In this case, oxygen is initially injected into the first stage of the converter during warm-up of the converter.

It is critical to the present invention that, of the active metals present in the catalyst, at least 75 wt.% of said metals comprises nickel. Based on total active metals, the rhodium comprises 0.04 to 2.5 wt.%; and, if they are present, platinum and palladium comprise from 0.17 to 4.7 wt.%, based on total active metals. Although the principal active metals are nickel, rhodium, platinum and/or palladium, small amounts of other metal components, such as, for example, chromium, cobalt or iron, may also be present.

The two most preferred catalytic compositions have the following metal concentrations: Composition No. 1 — 97.3 to 99.96 wt.% nickel and 0.04 to 2.7 wt.% rhodium, based on total active metals; and Composition No. 2 — 92.8 to 99.8 wt.% nickel, 0.04 to 2.5 wt.% rhodium, and 0.17 to 4.7 wt.% platinum and/or palladium, based on total active metals.

According to the present invention, the monolithic ceramic support is impregnated with solutions containing salts of the metals. Next the diluent of each solution is removed. Finally, the monolithic ceramic support with the catalyst salts on it is calcined at temperatures of 1,000° F to 1,500° F for a period of time of up to 16 hours in air. If an aqueous wash coat including alumina is used to enhance the surface area of the monolithic support, the wash coat is applied, water is then removed, and calcination at 1,000° F. is conducted. This process usually provides a surface area of 20 to 50 square meters per gram of catalyst. The mixing of nickel and rhodium salts together and the simultaneous application of them to the monolith, however, has not produced a very active catalyst. The most preferred technique is sequentially impregnating the monolith first with nickel and then with rhodium. When platinum and/or palladium are used, they are applied to the monolith after the nickel has been applied but prior to the application of the rhodium. In each instance, the monolith is dipped into a solution (ordinarily an aqueous solution is used) containing the dissolved salt. The diluent is then removed from the solution on the monolith, for example, by warming to vaporize the water. This leaves a deposit of the salt. The final step is calcination of the saltimpregnated support in air at a temperature in the range of from about 1,000° to about 1,500° F. This sequence is employed to each metal to be applied to the monolithic ceramic support.

In view of the above, the method for preparing a catalyst comprising a nickel component, a rhodium component, and a monolithic ceramic support is a method which comprises the following steps in the specified sequence: (1) applying to said support a first solution, said first solution containing a dissolved salt of nickel; (2) removing the diluent of said first solution from said support to deposit on said support the salt of said first solution; (3) calcining said support with the salt of said first solution thereon in air at a temperature of about 1,000° to 1,500° F.; (4) applying to said support a second solution, said second solution containing a dissolved salt of rhodium; (5) removing the diluent of said second solution from said support to deposit on said support the salt of said second solution; and (6) calcining said support with the salt of said second solution thereon in air at a temperature of about 1,000° to 1,500° F.

The method may comprise further coating said support with a wash coat of a ceramic material having a relatively high surface area prior to applying said first solution to said support, said wash coat having a surface area that will provide the coated ceramic support with a surface area that is at least 10 square meters per gram. Moreover, the method further may comprise applying to said support a solution containing a dissolved salt of platinum and/or applying a solution containing a dissolved salt of palladium, the application of each solution being followed by the removal of the diluent of that solution to deposit on said support the salt of that solution and the calcination of said support with the salt of that solution thereon at a temperature of about 1,000° to 1,500° F. and the application of each solution being made subsequent to the deposition of the nickel component and prior to the deposition of the rhodium component.

The following examples are presented for the purpose of illustration only and are not intended to limit the scope of the present invention. The tests of the catalyst in these examples were conducted in the laboratory screening apparatus and by the method described in Paper No. 710291 of S.A.E. TRANSACTIONS, Volume 80, pages 1126–1138 (1971).

EXAMPLE 1

In this example, catalysts were prepared and tests were conducted to demonstrate the effect of the absence or presence of nickel upon the activity of a catalyst for converting nitrogen oxides to ammonia. Table I hereinbelow illustrates this effect. Three different types of catalysts were employed. Catalyst No. 1 was a monolithic ceramic support impregnated with palladium and rhodium and did not include nickel. Catalyst No. 2 was a monolithic ceramic support impregnated with nickel, palladium, and rhodium. Catalyst No. 3 was a monolithic ceramic support impregnated with nickel and rhodium.

Catalyst No. 1 was prepared to contain 3 wt.% alumina, 0.1 wt.% palladium, and 0.05 wt.% rhodium, based upon the weight of the catalyst. Its method of preparation was as follows:

Step A: A 2-inch square piece of beta-spodumene honeycomb (Corning Glass Works) was dipped into a suspension of "Dispal" M (Continental Oil Co.) alumina containing about 10% alumina. After being oven dried at 200° F. in air overnight, the material was calcined in air at 1,000° F. for 7 hours.

Step B: The material from Step A was dipped into a solution prepared by dissolving 0.86 gm. of palladium nitrate in 100 ml. of water and converting it to its amine complex by the addition of ammonia. After being oven dried at 200° F. in air overnight, the material was calcined in air at 1,000° F. for 7 hours.

Step C: The material from Step B was dipped into a solution prepared by dissolving 0.62 gm. of rhodium nitrate (Alfa Chemicals 63106) in 100 ml. of water. After being oven dried in air at 200° F. overnight, the material was calcined, first at 1,000° F. for 7 hours and then at 1,400° F. for 4 hours.

Catalyst No. 2 was prepared to contain 3 wt.% alumina, 7 wt.% nickel oxide, 0.1 wt.% palladium, and 0.05 wt.% rhodium, based upon the weight of the catalyst. Its method of preparation was as follows:

Step A: A 2-inch square piece of beta-spodumene honeycomb (Corning Glass Works) was dipped into a suspension of "Dispal" M (Continental Oil Co.) alumina containing about 10% alumina. After being oven dried in air at 200° F. overnight, the material was calcined in air for 7 hours at 1,000° F.

Step B: The material from Step A was dipped into 200 ml. of a hot solution (about 150° F.) prepared by dissolving 1890 gms. of nickel nitrate [$Ni(NO_3)_2 \cdot 6H_2O$] in 250 ml. of water. After being oven dried in air at 200° F. overnight, the material was calcined in air, first at 1,000° F. for 7 hours and then at 1,400° F. for 4 hours.

Step C: The material from Step B was dipped into a solution prepared by dissolving 0.86 gm. of palladium nitrate in 100 ml. of water and converting it to its amine complex by the addition of ammonia. After being oven dried in air at 200° F. overnight, the material was calcined in air at 1,000° F. for 7 hours.

Step D: The material from Step C was dipped into a solution prepared by dissolving 0.62 gm. of rhodium nitrate (Alfa Chemicals 63106) in 100 ml. of water. After being oven dried at 200° F. overnight, the material was calcined, first at 1,000° F. for 7 hours and then at 1,400° F. for 4 hours.

Catalyst No. 3 was prepared to contain 3 wt.% alumina, 7 wt.% nickel oxide, and 0.05 wt.% rhodium, based upon the weight of the catalyst. Its method of preparation was as follows:

Step A: A 2-inch square piece of beta-spodumene honeycomb (Corning Glass Works) was dipped into a suspension of "Dispal" M (Continental Oil Co.) alumina containing about 10% alumina. After being oven dried in air at 200°F. overnight, the material was calcined in air at 1,000° F. for 7 hours.

Step B: The material from Step A was dipped into 200 ml. of a hot solution (about 150° F.) prepared by dissolving 1890 gms. of nickel nitrate [$Ni(NO_3)_2 \cdot 6H_2O$] in 250 ml. of water, followed by drying in the oven overnight in air at 200° F. and calcination in air, first for 7 hours at 1,000° F. and then for 4 hours at 1,400° F.

Step C: The material from Step B was dipped into a solution prepared by dissolving 0.62 gm. of rhodium nitrate (Alfa Chemicals 63106) in 100 ml. of water. After being dried in the oven in air at 200° F. overnight, the material was calcined in air, first for 7 hours at 1,000° F. and then for 4 hours at 1,400° F.

Catalyst No. 1, Catalyst No. 2, and Catalyst No. 3 were used under the same conditions to convert nitrogen oxide gases to reduced form. Conversion was conducted at a temperature of 1,020° F. and at carbon monoxide levels of 1% and then at carbon monoxide levels of 1.5% in the exhaust gas. At higher carbon monoxide levels, the likelihood of ammonia formation is greater.

Table I

Effect of Nickel Upon Conversion of $NO_x$ to $NH_3$

| Catalyst No. | % NiO | % Conversion to $NH_3$ at 1,020° F. | |
|---|---|---|---|
| | | at 1% CO | At 1.5% CO |
| 1 | 0 | 32 | 52 |
| 2 | 7 | 7 | 23 |

Table I-continued

Effect of Nickel Upon Conversion of $NO_x$ to $NH_3$

| Catalyst No. | % NiO | % Conversion to $NH_3$ at 1,020° F. | |
|---|---|---|---|
| | | at 1% CO | At 1.5% CO |
| 3 | 7 | 9 | 23 |

At the 1% carbon monoxide level, 32% of the nitrogen oxide gases were converted to ammonia when a catalyst which did not include nickel was employed. In contrast, nickel-containing catalysts converted less than 10% of the nitrogen oxides to ammonia. At the higher carbon monoxide level, the effect of nickel was not as great; however, either nickel-containing catalyst, nevertheless, produced less than half the ammonia produced by the catalyst which did not contain nickel.

EXAMPLE 2

Figure 3:
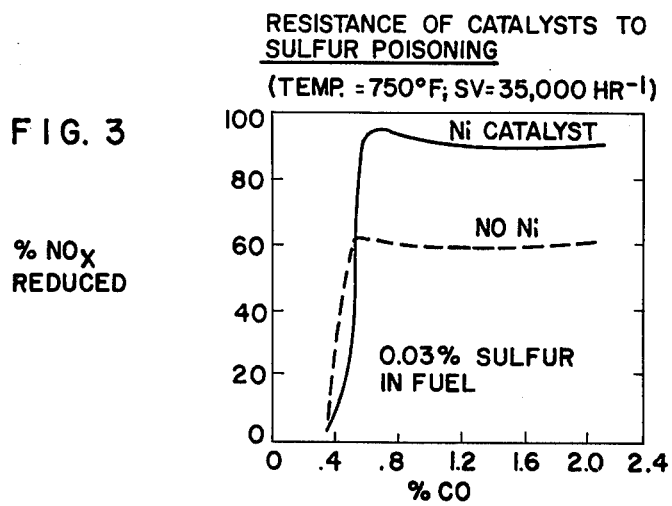
FIG. 3 is a graph showing the effect of sulfur on one catalyst which contains nickel and another catalyst which does not contain nickel.

This example illustrates the ability of a nickel-containing catalyst to prevent or minimize sulfur poisoning of the catalyst. This ability is presented in FIG. 3, which is a plot of the percent nitrogen oxide reduction versus the percent carbon monoxide in the exhaust gas. The test run was conducted at 750° F. and a space velocity of 35,000 reciprocal hours (hr.$^{-1}$). Exhaust gases were produced using a fuel containing 0.03% sulfur. Such exhaust gases, containing the various amounts of carbon monoxide, were passed over the test catalyst. In this series of tests, Catalyst No. 1 and Catalyst No. 2 of Example 1 were employed. Catalyst No. 2 contained nickel, while Catalyst No. 1 did not contain nickel. Both catalysts contained rhodium and palladium on the monolithic support. As the graph shows, the nickel-containing catalyst had an activity of close to 90% at carbon monoxide levels in excess of about 0.8%. In contrast, the catalyst which did not contain nickel achieved an activity of only 60% $NO_x$ reduction.

EXAMPLE 3

This example also illustrates the effect of the absence or presence of nickel upon the ability of the catalyst to resist sulfur poisoning. Catalyst No. 3, described in Example 1, represented the catalyst containing nickel and rhodium while Catalyst No. 4 was a monolithic ceramic support impregnated only with rhodium.

Catalyst No. 4 was prepared to contain 3 wt.% alumina and 0.05 wt.% rhodium, based upon the weight of the catalyst. Its method of preparation was as follows:
Step A: A 2-inch square piece of beta-spodumene honeycomb (Corning Glass Works) was dipped into a suspension of "Dispal" M (Continental Oil Co.) alumina containing about 10% alumina. After being oven dried in air at 200°F. overnight, the material was calcined in air at 1,000° F. for 7 hours.
Step B: The material from Step A was dipped into a solution prepared by dissolving 0.62 gm. of rhodium nitrate (Alfa Chemicals 63106) in 100 ml. of water. After being oven dried in air at 200° F. overnight, the material was calcined in air, first for 7 hours at 1,000° F. and then for 4 hours at 1,400° F.

These two catalysts were used to reduce nitrogen oxide gases as the gases passed over the catalyst at a temperature of 750° F. The exhaust gases were produced using a fuel containing 0.03% sulfur. The catalysts were tested under different $CO/O_2$ ratios. As this ratio increases, the catalyst becomes more effective because of the greater amount of carbon monoxide in the gases. However, more fuel is needed and the likelihood of greater ammonia formation increases as this ratio increases. As Table II hereinbelow illustrates, the catalyst with nickel has a higher activity at low $CO/O_2$ ratios and maintains this activity as the ratio increases.

Table II

Effect of Nickel upon Sulfur Resistance of Catalyst
(at 75° F. and 0.03 % sulfur in fuel)

| Catalyst No. 3 (nickel present) | | Catalyst No. 4 (no nickel present) | |
|---|---|---|---|
| % $NO_x$ Reduced | $CO/O_2$ | % $NO_x$ Reduced | $CO/O_2$ |
| 80 | 0.8 | 50 | 0.8 |
| 95 | 1.0 | 75 | 1.0 |
| 96 | 1.5 | 95 | 1.5 |

EXAMPLE 4

In this example, several catalysts were prepared and tested to demonstrate the effect of rhodium concentration upon activities of aged nickel-rhodium catalysts. The activities were expressed as % $NO_x$ reduction. Each of these catalysts was prepared as follows:
Step A: A 4-5/8-inch diameter by 3-inch long cylindrical piece of beta-spodumene honeycomb (Corning Glass Works) was dipped into a suspension of "Dispal" M (Continental Oil Co.) alumina containing about 10% alumina. After being oven dried in air at 200° F. overnight, the material was calcined in air at 1,000° F. for 7 hours.
Step B: The material from Step A was dipped into a hot solution (about 150° F.) prepared by dissolving 1890 gms. of nickel nitrate [$Ni(NO_3)_2 \cdot 6H_2O$] in 250 ml. of water. After being oven dried in air at 200° F. overnight, the material was calcined in air at 1,400° F. for 7 hours.
Step C: The material from Step B was dipped into a solution prepared by dissolving the amount of rhodium nitrate (Alfa Chemicals 63106) specified hereinbelow in 800 ml. of water. After being oven dried in air at 200° F. overnight, the material was calcined in air, first at 1,000° F. for 7 hours and then at 1,400° F. for 4 hours.

Each of these catalysts, identified as Catalysts Nos. 5 through 13, was prepared to contain 3 wt.% alumina, 10 wt.% nickel oxide, and the amount of rhodium shown hereinbelow in Table IV in Example VIII. Each of the catalysts was aged for 10 hours at a temperature of about 1652° F. under alternating oxidizing (5 hours) and reducing (5 hours) conditions. After the aging treatment, each was tested at various temperatures, namely, 752°, 662° and 572° F., and an hourly space velocity of 35,000 hr.$^{-1}$. The results of these tests are presented in Table IV and in FIG. 4.

Figure 4:
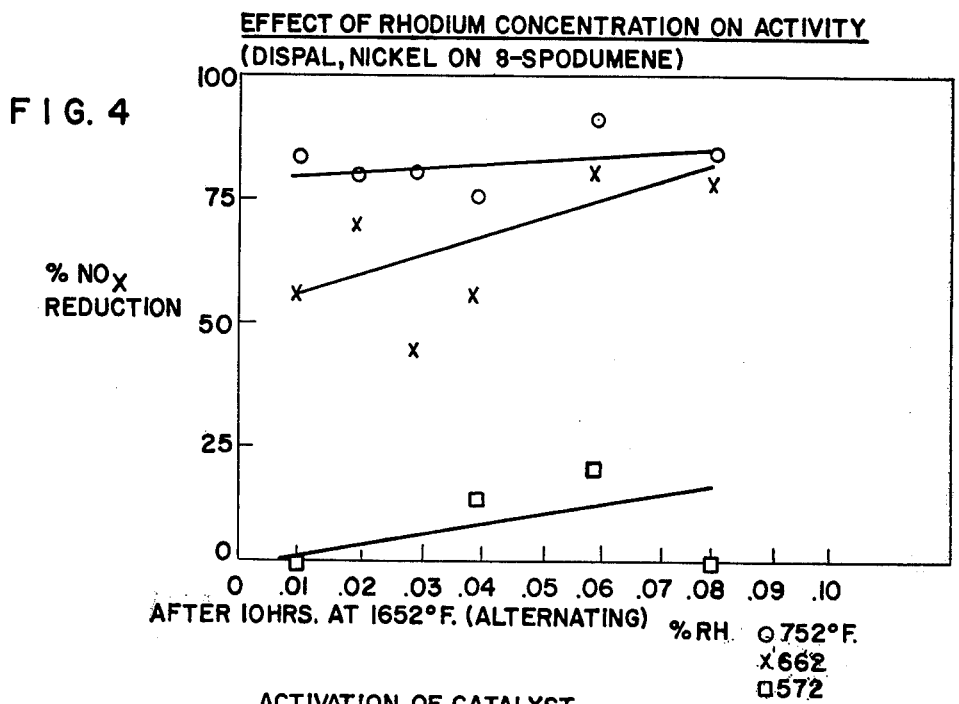
FIG. 4 is a graph showing the effect of rhodium concentration on catalyst activity.

FIG. 4 illustrates the effect of the amount of rhodium upon catalyst activity at the three different temperature levels.

In FIG. 4, % $NO_x$ reduction is plotted versus % rhodium concentration to provide three straight lines. As shown at the space velocity of 35,000 hr.$^{-1}$, the catalysts are not very effective at a temperature below about 600° F., and activity decreases as rhodium concentration decreases. However, at 750° F., a catalyst containing only 0.01% rhodium is still very active.

EXAMPLE 5

In this example, several catalysts were tested for their abilities to reduce nitrogen oxides in exhaust gases.

Catalyst No. 14 was prepared to contain 3 wt.% alumina, 7 wt.% nickel oxide, 0.1 wt.% palladium, and 0.05 wt.% rhodium on betaspodumene. Its preparation was as follows:

Step A: A 4-⅝ inch-diameter by 3-inch long cylindrical piece of betaspodumene honeycomb (Corning Glass Works) was dipped into a suspension of "Dispal" M (Continental Oil Co.) alumina containing about 10% alumina. After being oven dried in air at 200° F. overnight, the material was calcined in air at 1,000° F. for 7 hours.

Step B: The material from Step A was dipped into a hot solution (about 150° F.) of 1890 gms. of nickel nitrate [Ni(NO$_3$)$_2$ . 6H$_2$O] in 250 ml. water; after being dried overnight in the oven in air at 200° F., the material was calcined in air, first at 1,000° F. overnight and then at 1,400° F. for 7 hours.

Step C: The material from Step B was dipped into a solution containing 8.6 gms. of palladium nitrate (Fisher P-8 as ammine) in 1,000 ml. of water. The material was then dried in the oven in air at 200° F. overnight and calcined in air at 1,000° F. for 7 hours.

Step D: The material from Step C was dipped into a solution of 5 gms. of rhodium nitrate (Alfa Chemicals 63106) in 800 ml. of water. After being dried in the oven at 200° F. overnight in air, the material was calcined in air, first at 1,000° F. for 7 hours and then at 1,400° F. for 4 hours to give the final catalyst.

Catalyst No. 14, when tested at 750° F. with an exhaust gas containing about 1.5% CO (CO/O$_2$ = 2) and about 700 ppm NO$_x$, gave 85% reduction in NO$_x$. After a 40-hour treatment at 1,500° F. with alternating CO-rich and CO-lean exhaust gases, it still produced 84% reduction under the same conditions.

Catalyst NO. 15 was prepared to contain 3 wt.% alumina, 7 wt.% nickel oxide, 0.1 wt.% platinum, and 0.05 wt.% rhodium, based on total catalyst. Its preparation was as follows:

Step A: A 2-inch square piece of beta-spodumene honeycomb (Corning Glass Works) was dipped into a suspension of "Dispal" M (Continental Oil Co.) alumina containing about 10% alumina. After being oven dried in air at 200° F. overnight, the material was calcined in air at 1,000° F. for 7 hours.

Step B: The material from Step A was dipped into 200 ml. of a hot solution (about 150° F.) prepared by dissolving 1890 gms. of nickel nitrate [Ni(NO$_3$)$_2$ . 6H$_2$O] in 250 ml. of water. After being oven dried in air at 200° F. overnight, the material was calcined in air, first at 1,000° F. for 7 hours and then at 1,400° F. for 4 hours.

Step C: The material from Step B was dipped into a solution prepared by dissolving 0.984 gm. of chloroplatinic acid in 100 ml. of water. After being oven dried in air at 200° F. overnight, the material was calcined in air at 1,000° F. for 7 hours.

Step D: The material from Step C was dipped into a solution prepared by dissolving 0.62 gm. of rhodium nitrate (Alfa Chemicals 63106) in 100 ml. of water. After being oven dried in air at 200° F. overnight, the material was calcined in air, first at 1,000° F. for 7 hours and then at 1,400° F. for 4 hours.

Catalyst No. 15 and the three catalysts described in Example 1 hereinabove, namely, Catalyst No. 1, Catalyst No. 2, and Catalyst No. 3, were tested at a temperature of 750° F. with an exhaust gas containing 1.5% CO (CO/O$_2$ = 3) and having been obtained from a fuel containing 0.03% sulfur. Catalyst No. 15 provided 92% NO$_x$ reduction; Catlayst No. 1, 58% NO$_x$ reduction; Catalyst No. 2, 97% NO$_x$ reduction; and Catalyst No. 3, 96% NO$_x$ reduction. Only Catalyst No. 1, the sole catalyst not containing nickel, provided poor activity.

EXAMPLE 6

In this example, tests were performed to demonstrate the effect of varying the method of incorporation of the metals on a coated monolithic ceramic support.

Catalyst No. 16 was prepared to contain nickel and rhodium, the metals being applied simultaneously to the coated monolithic ceramic support. The preparation was as follows:

Step A: A piece of EX-20 monolithic substrate (Corning Glass Works) was dipped into an aqueous 10% alumina suspension of GB-200 (Rhodia, Inc.) to form a coated substrate, which was oven dried in air overnight at 215° F. and then calcined in air at 1,000° F. for 7 hours.

Step B: The material from Step A was dipped into 200 ml. of a hot (about 150° F.) aqueous solution containing 260 gms. of nickel nitrate [Ni(NO$_3$)$_2$ . 6H$_2$O] and 0.188 gm. of rhodium, which was added as a 10% solution of the nitrate. This solution contained 0.94 gm. of rhodium per liter. After being oven dried in air overnight at 215° F., the material was calcined in air at 1,400° F. for 4 hours.

Catalyst No. 17 was prepared by the consecutive application of nickel and rhodium to the coated monolithic ceramic support. The preparation was as follows:

Step A: A piece of EX-20 monolithic substrate (Corning Glass Works) was dipped into an aqueous 10% alumina suspension of GB-200 (Rhodia, Inc,) to form a coated substrate, which was oven dried in air overnight at 215° F. and calcined in air at 1,000 ° F. for 7 hours.

Step B: The material from Step A was dipped into 200 ml. of a hot (about 150° F.) aqueous solution containing 260 gms. of nickel nitrate having the same concentration of nickel as that used for the preparation of Catalyst No. 16 described hereinabove. After being oven dried in air overnight at 215° F., the material was calcined in air, first at 1,000° f. for 7 hours and then at 1,400° F. for 4 hours.

Step C: The material from Step B was dipped into about 200 ml. of an aqueous solution containing 0.94 gm. of rhodium per liter as the nitrate. After being oven dried overnight in air at 215° F., the material was calcined in air at 1,000° F. for 7 hours.

Catalyst No. 16 and Catalyst No. 17 were tested at an hourly space velocity of 35,000 hr.$^{-1}$ and the temperatures shown hereinbelow after each catalyst had been aged at a temperature of 1650° F. under alternating oxidizing and reducing conditions, i.e., three hours with an exhaust gas having a CO/O$_2$ ratio that is less than 0.5 and three hours with an exhaust gas having a CO/O$_2$ ratio that is greater than 2, respectively. The oxidizing and reducing conditions were obtained by varying the fuel-to-air ratio to the exhaust generator. The results of these tests are presented hereinbelow in Table III.

Table III

Effect of Metals Addition in Catalyst Preparation

| Catalyst No. | Metals Addition | Temp., °F. | % $NO_x$ Reduction | % CO | % $O_2$ |
|---|---|---|---|---|---|
| 16 | simultaneous | 752 | 69 | 1.42 | 0.22 |
|  |  | 662 | 41 | 1.50 | 0.22 |
|  |  | 572 | 0 | 1.54 | 0.23 |
| 17 | consecutive | 752 | 98 | 1.60 | 0.21 |
|  |  | 662 | 98 | 1.51 | 0.20 |
|  |  | 572 | 67 | 1.56 | 0.20 |
|  |  | 482 | 0 | 1.65 | 0.20 |

These tests demonstrate that Catalyst No. 17, having nickel and rhodium applied consecutively to the coated monolithic ceramic support material and being an embodiment of the catalyst of the present invention, provides unexpectedly a performance that is superior to that of Catalyst No. 16, which had the nickel and rhodium applied simultaneously to the coated support material.

EXAMPLE 7

Activation of a nickel-rhodium-palladium catalyst is presented in this example. The catalyst is Catalyst No. 2, which is described in Example 1. Its activation at different temperatures is presented in FIG. 5.

It has been found that freshly prepared catalyst initially may have a low activity. Such catalyst can be activated by subjecting it to reduction conditions at temperatures in excess of 1,000° F. for a very short time to substantially increase the catalyst activity. Suitable reduction conditions could be exposing the catalyst to the exhaust gas from an automobile operated under fuel-rich conditions to provide a carbon monoxide concentration in excess of 1.5% and a $CO/O_2$ ratio of 3 to 4.

Figure 5:
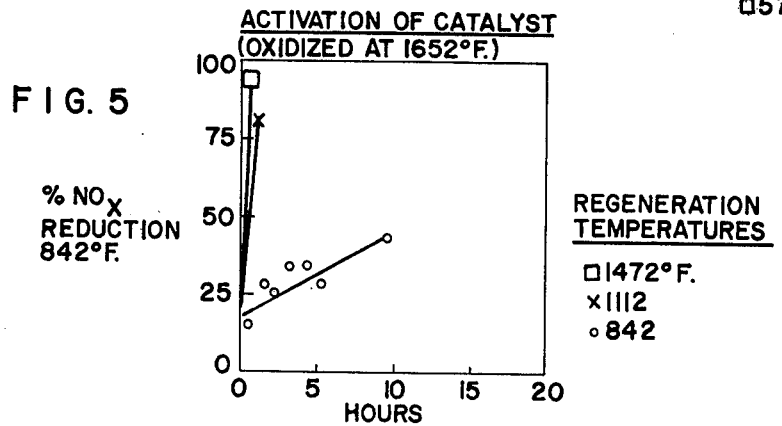
FIG. 5 is a graph showing the effect of activating the catalyst of the invention at different temperatures.

As shown in FIG. 5, at a temperature of 842° F. it would take well over 10 hours to activate the catalyst to provide activity at about 50% $NO_x$ reduction. However, at temperatures in excess of 1,000° F., catalyst activity exceeds 75% within an hour after exposure of the freshly prepared catalyst to reducing conditions at high temperatures.

EXAMPLE 8

In Example 4 hereinabove, several catalysts were prepared and tested to demonstrate the effect of rhodium concentration upon aged activities of nickel-rhodium catalyst. The preparations of these catalysts and their tests are discussed in Example 4. In addition, the catalysts without aging were tested under the same conditions. The data obtained from these tests are presented in Table IV.

Table IV

Effect of Rhodium Concentration Upon Catalyst Activity

| Catalyst No. | Wt. % Rhodium in Catalyst | Rhodium Nitrate Concentration, gms./100 ml. $H_2O$ | Hours at 1650° F. | % $NO_x$ Reduction |
|---|---|---|---|---|
| 5 | 0.001 | 0.012 | 0 | 64 |
|  |  |  | 10 | 14 |
| 6 | 0.004 | 0.048 | 0 | 56 |
|  |  |  | 10 | 14 |
| 7 | 0.008 | 0.096 | 0 | 88 |
|  |  |  | 10 | 39 |
| 8 | 0.01 | 0.12 | 0 | 89 |
|  |  |  | 10 | 83 |
| 9 | 0.02 | 0.25 | 0 | 85 |
|  |  |  | 10 | 79 |
| 10 | 0.03 | 0.37 | 0 | 86 |
|  |  |  | 10 | 80 |
| 11 | 0.04 | 0.50 | 0 | 87 |
|  |  |  | 10 | 75 |
| 12 | 0.06 | 0.74 | 0 | 88 |
|  |  |  | 10 | 92 |
| 13 | 0.08 | 0.99 | 0 | 85 |
|  |  |  | 10 | 84 |

Figure 6:
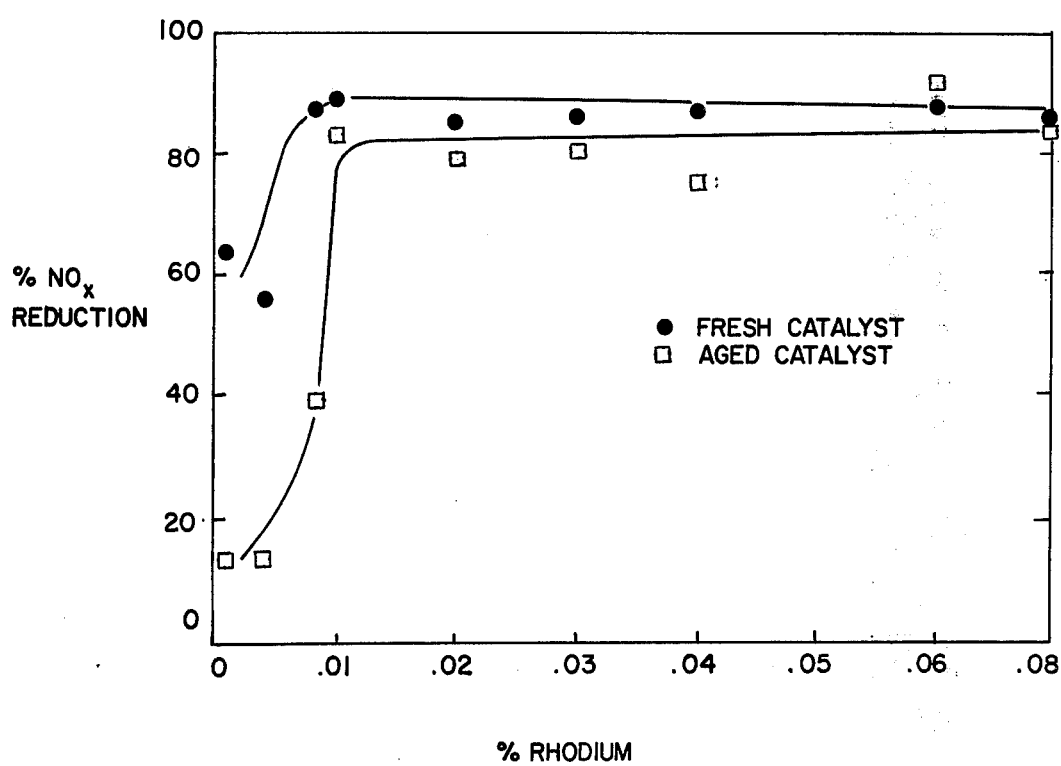
FIG. 6 is a plot showing the effect of the amount of rhodium in the catalyst upon the activity of the catalyst.

The activity data presented in this Table IV are plotted in FIG. 6. Activity, represented by "% $NO_x$ reduction", is plotted against the amount of rhodium on the catalyst. Unexpected and dramatic breaks at 0.008 wt.% rhodium and 0.01 wt.% rhodium occur for the freshly-prepared catalyst and the aged catalyst, respectively. Since aged activity appears to be more desirable for emission control systems, a lower limit of 0.01 wt.% rhodium is preferred. The preferred upper limit of 0.06 wt.% rhodium is set on the basis of estimated world supply of rhodium and the minimum size of $NO_x$ catalyst required for $NO_x$ control in a vehicle.

It is believed that the catalyst of the present invention is suitable for use on a commercial scale in automobiles. It has excellent activity at low temperatures. It warms up quickly and can endure the extreme conditions of the automobile for prolonged durations. Engine dynamometer testing has indicated that the catalyst of the present invention can be used in excess of over 500 hours without a serious loss in activity. Moreover, this catalyst, in contrast to pelleted $NO_x$ catalysts, tends to promote oxidation of hydrocarbons and carbon monoxide more effectively. Typical exhaust conditions are temperatures of 700° to 1,800° F., carbon monoxide concentrations of 0.8 percent or, more preferably, 1 to 2 percent, and a $CO/O_2$ ratio in excess of 1, preferably, from about 1–2. However, it is best to operate near the 1% carbon monoxide level and a $CO/O_2$ ratio of 1 to minimize ammonia formation. The space velocity of gases flowing over the catalyst varies from about 15,000 to 200,000 hr.$^{-1}$. $NO_x$ emissions are most prevalent when the automobile is operated at steady state conditions and the catalyst of the present invention is effective to minimize such $NO_x$ emission to levels which meet the standards of the Clean Air Act.

What is claimed is:

1. A catalyst for the reduction of nitrogen oxides in the exhaust gas from an internal combustion engine, which catalyst comprises a nickel component, a rhodium component, and a monolithic ceramic support for said nickel component and said rhodium component, said nickel component being present in an amount ranging from 2.5 to 12 wt.%, expressed as the metal and based on total catalyst weight, and comprising at least 75 wt.% of the total active metals present, and said rhodium component being present in an amount ranging from 0.01 to 0.08 wt.%, expressed as the metal and based on total catalyst weight, said catalyst being prepared by sequentially applying in the order specified hereinbelow to said monolithic ceramic support first a solution containing a dissolved salt of nickel and second a solution containing a dissolved salt of rhodium, the application of each solution being followed by the removal of the diluent of that solution by drying to deposit on the support the salt of that solution and the calcination of the support with the salt of that solution thereon, said calcination being conducted in air at a temperature of about 1,000° to 1,500°]F.

2. The catalyst of claim 1 wherein the surface area of said monolithic ceramic support is at least 10 square meters per gram.

3. The catalyst of claim 1 wherein said monolithic ceramic support comprises alumina, aluminum silicate, lithium aluminum silicate, magnesium aluminum silicate, or silicon nitride.

4. The catalyst of claim 1 wherein, prior to deposition of said nickel component and said rhodium component, said monolithic ceramic support is coated with a wash coat of a ceramic material having a relatively high surface area, said wash coat having a surface area that will provide the coated ceramic support with a surface area that is at least 10 square meters per gram.

5. The catalyst of claim 1 wherein said catalyst also comprises a platinum component, or a palladium component, or a mixture thereof, said platinum component and/or said palladium component being present in an amount of 0.02 to 0.15 wt.%, expressed as the metal and based on total catalyst weight, the deposition of said platinum component and/or said palladium component being performed subsequent to that of the nickel component and prior to that of the rhodium component and comprising applying to said monolithic ceramic support a solution containing a dissolved salt of platinum and/or applying a solution containing a dissolved salt of palladium, the application of each solution being followed by the removal of the diluent of that solution by drying to deposit on the support the salt of that solution and the calcination of the support with the salt of that solution thereon, said calcination being conducted in air at a temperature of about 1,000° to 1,500° F.

6. The catalyst of claim 2 wherein said monolithic ceramic support comprises alumina, aluminum silicate, lithium aluminum silicate, magnesium aluminum silicate, or silicon nitride.

7. The catalyst of claim 3 wherein, prior to deposition of said nickel component and said rhodium component, said monolithic ceramic support is coated with a wash coat of a ceramic material having a relatively high surface area, said wash coat having a surface area that will provide the coated ceramic support with a surface area that is at least 10 square meters per gram.

8. The catalyst of claim 3 wherein said catalyst also comprises a platinum component, or palladium component, or a mixture thereof, said platinum component and/or said palladium component being present in an amount of 0.02 to 0.15 wt.%, expressed as the metal and based on total catalyst weight, the deposition of said platinum component and/or said palladium component being performed subsequent to that of the nickel component and prior to that of the rhodium component and comprising applying to said monolithic ceramic support a solution containing a dissolved salt of platinum and or applying a solution containing a dissolved salt of palladium, the application of each solution being followed by the removal of the diluent of that solution by drying to deposit on the support the salt of that solution and the calcination of the support with the salt of that solution thereon, said calcination being conducted in air at a temperature of about 1,000° to 1,500° F.

9. The catalyst of 4 wherein said catalyst also comprises a platinum component, or a palladium component, or a mixture thereof, said platinum component being present in an amount of 0.02 to 0.15 wt.%, expressed as the metal and based on total catalyst weight, the deposition of said platinum component and/or said palladium component being performed subsequent to that of the nickel component and prior to that of the rhodium component and comprising applying to said monolithic ceramic support a solution containing a dissolved salt of platinum and/or applying a solution containing a dissolved salt of palladium, the application of each solution being followed by the removal of the diluent of the solution by drying to deposit on the support the salt of that solution and the calcination of the support with the salt of that solution thereon, said calcination being conducted in air at a temperature of about 1,000° to 1,500° F.

10. The catalyst of claim 6 wherein, prior to deposition of said nickel component and said rhodium component, said monolithic ceramic support is coated with a wash coat of a ceramic material having a relatively high surface area, said wash coat having a surface area that will provide the coated ceramic support with a surface area that is at least 10 square meters per gram.

11. The catalyst of claim 6 wherein said catalyst also comprises a platinum component, or a palladium component, or a mixture thereof, said platinum component and/or said palladium component being present in an amount of 0.02 to 0.15 wt.%, expressed as the metal and based on total catalyst weight, the deposition of said platinum component and/or said palladium component being performed subsequent to that of the nickel component and prior to that of the rhodium component and comprising applying to said monolithic ceramic support a solution containing a dissolved salt of platinum and/or applying a solution containing a dissolved salt of palladium, the application of each solution being followed by the removal of the diluent of that solution by drying to deposit on the support the salt of that solution and the calcination of the support with the salt of that solution thereon, said calcination being conducted in air at a temperature of about 1,000° to 1,500° F.

12. The catalyst of claim 7 wherein said catalyst also comprises a platinum component, or a palladium component, or a mixture thereof, said platinum component and/or said palladium component being present in an amount of 0.02 to 0.15 wt.%, expressed as the metal and based on total catalyst weight, the deposition of said platinum component and/or said palladium component being performed subsequent to that of the nickel component and prior to that of the rhodium component and comprising applying to said monolithic ceramic support a solution containing a dissolved salt of platinum and/or applying a solution containing a dissolved salt of palladium, the application of each solution being followed by the removal of the diluent of that solution by drying to deposit on the support the salt of that solution and the calcination of the support with the salt of that solution thereon, said calcination being conducted in air at a temperature of about 1,000° to 1,500° F.

13. The catalyst of claim 10 wherein said catalyst also comprises a platium component, or a palladium component, or a mixture thereof, said platinum component and/or said palladium component being present in an amount of 0.02 to 0.15 wt.%, expressed as the metal and based on total catalyst weight, the deposition of said platinum component and/or said palladium component being performed subsequent to that of the nickel component and prior to that of the rhodium component and comprising applying to said monolithic ceramic support a solution containing a dissolved salt of platinum and/or applying a solution containing a dissolved salt of palladium, the application of each solution being followed by the removal of the diluent of that solution by drying to deposit on the support the salt of that solution and the calcination of the support with the salt of that solution thereon, said calcination being conducted in air at a temperature of about 1,000° to 1,500° F.

14. A method for preparing a catalyst comprising a nickel component, a rhodium component, and a monolithic ceramic support, which method comprises the following steps in the specified sequence: (1) applying to said support a first solution, said first solution containing a dissolved salt of nickel; (2) removing the diluent of said first solution from said support by drying to deposit on said support the salt of said first solution; (3) calcining said support with the salt of said first solution thereon in air at a temperature of about 1,000° to 1,500° F. ; (4) applying to said support a second solution, said second solution containing a dissolved salt of rhodium; (5) removing the diluent of said second solution from said support by drying to deposit on said support the salt of said second solution; and (6) calcining said support with the salt of said second solution thereon in air at a temperature of about 1,000° to 1,500° F.

15. The method of claim 14, which method comprises further coating said support with a wash coat of a ceramic material having a relatively high surface area prior to applying said first solution to said support, said wash coat having a surface area that will provide the coated ceraic support with a surface area that is at least 10 square meters per gram.

16. The method of claim 14, which method further comprises applying to said support a solution containing a dissolved salt of platinum and/or applying a solution containing a dissolved salt of palladium, the application of each solution being followed by the removal of the diluent of that solution by drying to deposit on said support the salt of that solution and the calcination of said support with the salt of that solution thereon at a temperature of about 1,000° to 1,500° F. and the appliction of each solution being made subsequent to the deposition of the nickel component and prior to the deposition of the rhodium component.

17. The method of claim 15, which method further comprises applying to said support a solution containing a dissolved salt of platinum and/or applying a solution containing a dissolved salt of palladium, the application of each solution being followed by the removal of the diluent of that solution by drying to deposit on said support the salt of that solution and the calcination of said support with the salt of that solution thereon at a temperature of about 1,000° to 1,500° F. and the application of each solution being made subsequent to the deposition of the nickel component and prior to the deposition of the rhodium component.

* * * * *

UNITED STATES PATENT OFFICE
CERTIFICATE OF CORRECTION

Patent No. 4,006,103　　　　　　　　　　Dated February 1, 1977

Inventor(s) Garbis H. Meguerian, Eugene H. Hirschberg, and Frederick W. Rakowsky It is certified that error appears in the above-identified patent and that said Letters Patent are hereby corrected as shown below:

| | | | |
|---|---|---|---|
| Column 1, line 48, | | "-2H$_2$" should be --2H$_2$--. |
| " 10, " 11, Table II | | "75 °F." should be --750 °F.--. |
| Column 15, line 22, | | "1,500 °]F." should be --1,500 °F.--. |
| " 16, " 18, | | "of 4" should be --of claim 4--. |
| " 16, " 20, | | "component" should be --component and/or said palladium component--. |
| " 16, " 31, | | "the solution" should be --that solution--. |
| " 18, " 15, | | "ceraic" should be --ceramic--. |
| " 18, " 26, | | "appliction" should be --application--. |

Signed and Sealed this

Third Day of August 1982

[SEAL]

Attest:

GERALD J. MOSSINGHOFF

Attesting Officer　　Commissioner of Patents and Trademarks